(12) United States Patent
Shimoda et al.

(10) Patent No.: US 6,338,245 B1
(45) Date of Patent: Jan. 15, 2002

(54) INTERNAL COMBUSTION ENGINE

(75) Inventors: Masatoshi Shimoda; Toshiaki Kakegawa; Haruyuki Yokota, all of Hino (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 09/659,736

(22) Filed: Sep. 11, 2000

(30) Foreign Application Priority Data

Sep. 17, 1999 (JP) .......................................... 11-263317

(51) Int. Cl.⁷ ................................................ F01N 3/00
(52) U.S. Cl. ............................. 60/285; 60/278; 60/280; 60/298; 60/311
(58) Field of Search .......................... 60/278, 280, 285, 60/298, 300, 297, 311, 301; 123/568.21

(56) References Cited

U.S. PATENT DOCUMENTS

| | | | |
|---|---|---|---|
| 4,719,751 A | * | 1/1988 | Kume et al. .................. 60/285 |
| 5,732,554 A | * | 3/1998 | Sasaki et al. ................. 60/285 |
| 5,890,360 A | * | 4/1999 | Sasaki et al. ................. 60/278 |
| 5,937,639 A | | 8/1999 | Sasaki et al. |
| 6,055,808 A | * | 5/2000 | Poola et al. .................. 60/285 |
| 6,152,118 A | * | 11/2000 | Sasaki et al. ................. 60/278 |
| 6,173,567 B1 | * | 1/2001 | Poola et al. .................. 60/280 |
| 6,209,515 B1 | * | 4/2001 | Gotoh et al. ................. 60/285 |
| 6,240,721 B1 | * | 6/2001 | Ito et al. ..................... 60/274 |
| 6,240,724 B1 | * | 6/2001 | Kudou et al. ................. 60/284 |

FOREIGN PATENT DOCUMENTS

JP          2864896          12/1998

* cited by examiner

Primary Examiner—Thomas Denion
Assistant Examiner—Diem Tran
(74) Attorney, Agent, or Firm—Oblon, Spivak, McClelland, Maier & Neustadt, P.C.

(57) ABSTRACT

A diesel engine includes a turbocharger, an intercooler, a particulate filtering unit, and an EGR cooler. EGR ratio of intake air, injection timing of an injection nozzle, and excess air ratio to fuel are controlled depending upon engine-operating load. Lean premixed compression ignition is performed at low engine load; low temperature combustion at low excess air ratio with high EGR ratio is performed at medium engine load; and normal EGR combustion is performed at high engine load.

7 Claims, 12 Drawing Sheets

F I G. 4
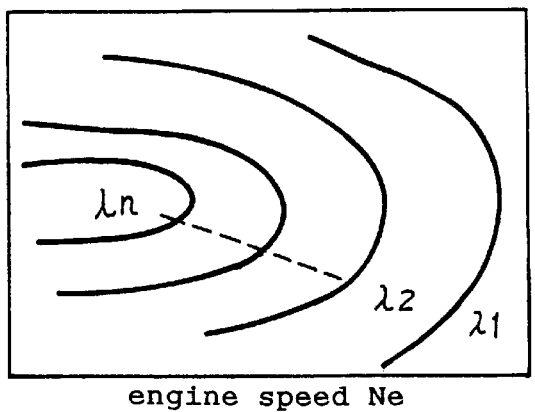
F I G. 5
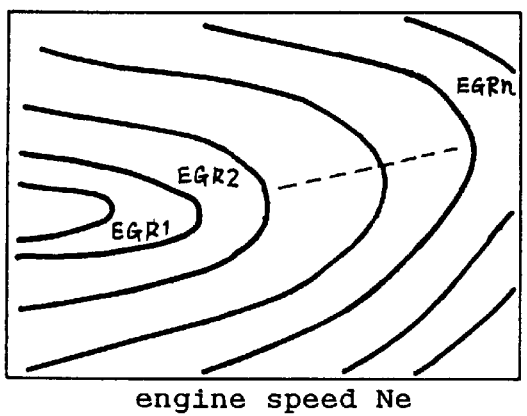

INTERNAL COMBUSTION ENGINE

BACKGROUND OF THE INVENTION

The present invention relates to an internal combustion engine.

In recent years, more and more strict regulations for control of exhaust gas from automobile has been enforced under strong demands on maintenance of better environmental conditions. In particular, for diesel vehicles, strict regulations have been enforced on $NO_x$ (nitrogen oxides) and soot (particulate matter) emissions in exhaust gas.

Conventionally, $NO_x$ and soot emissions in the exhaust gas are reduced, for example, by a lean premixed compression ignition method in which the timing of fuel injection is set earlier to prolong ignition delay. According to this method, fuel is burnt at low temperature since it is turned into lean gas mixture after completion of injection thereof. Thus, $NO_x$ and soot emissions in the exhaust gas can be reduced to substantially zero.

As a further conventional way to reduce $NO_x$ emission in exhaust gas, an EGR (Exhaust Gas Recirculation) system is known in which engine exhaust gas is partly recirculated as EGR gas together with intake air to the engine. The EGR gas has relatively high specific heat and can absorb a large amount of heat. As a result, the more the amount of the EGR gas is increased, i.e. the more the EGR ratio (amount of EGR gas/(amount of EGR gas+amount of intake air)) is increased, the more combustion temperature in combustion chamber is decreased and the more the amount of $NO_x$ produced is decreased.

A further conventional way to suppress $NO_x$ emission in exhaust gas is to use $NO_x$ catalyst which promotes decomposition of $NO_x$ into harmless gas.

Particulate matter in exhaust gas is conventionally reduced by using a diesel particulate filtering unit with a particulate filter therein (DPF) or a $NO_2$ regeneration type diesel particulate filtering unit (catalytic DPF).

The above-mentioned lean premixed compression ignition method may almost completely eliminate $NO_x$ and soot emissions at low to medium engine load; the amount of HC will, however, increase due to the fuel injection at earlier timing. Moreover, earlier ignition disadvantageously leads to higher fuel consumption. Furthermore, the method can hardly provide stable operation at high engine load because of possible abnormal combustion such as knocking.

In the case of the EGR system, $NO_x$ emission is reduced as the EGR ratio is increased; however, when the EGR ratio is increased beyond a certain limit, the amount of soot produced rapidly increases.

In the case of $NO_x$ catalyst being used, such $NO_x$ catalyst cannot fulfill its function completely and therefore is not enough for practical use.

Use of DPF or catalytic DPF may contribute to removal of particulate matter; but it has nothing to do with reduction of $NO_x$ emission at all.

To solve the above and other problems, it is an object of the invention to provide an improved internal combustion engine such as diesel engine which can reliably reduce $NO_x$ and particulate matter emissions in engine exhaust gas over all engine-operating load range from low to high load and which can also reduce fuel consumption.

BRIEF SUMMARY OF THE INVENTION

The internal combustion engine according to the invention comprises means for decreasing combustion temperature and means for increasing ignition delay, both of said means being used at low to medium engine load such that combustion of fuel in the engine is at a temperature lower than that at which $NO_x$ is produced and at an equivalent ratio lower than that at which soot is produced, said means for decreasing combustion temperature being used at medium to high engine load such that combustion of the fuel in the engine is at a temperature lower than that at which $NO_x$ or soot is produced.

The internal combustion engine according to the invention may further comprise an exhaust gas recirculation passage for communication of an exhaust conduit downstream of a turbine of a turbocharger with an intake conduit upstream of a compressor of the turbocharger, and means for removing particulate matter provided on a portion of the exhaust conduit upstream of a connection of said exhaust conduit with the exhaust gas recirculation passage.

The means for increasing ignition delay may comprise means for controlling timing of fuel injection to set earlier timing for fuel injection.

The means for decreasing combustion temperature may comprise means for recirculating exhaust gas to the engine via the exhaust gas recirculation passage.

Circulation ratio of the exhaust gas to be circulated to the engine via the exhaust gas recirculation passage may be set to more than about 40% at low to medium engine load, to more than about 50% at medium to high engine load and to less than about 50% at high engine load.

The internal combustion engine of the invention may further comprise means for cooling the exhaust gas in the exhaust gas recirculation passage.

As the engine load is increased, timing to close an intake valve for performing intake to the engine may be retarded by control means for adjusting said timing for closing.

Thus, according to the invention, it is ensured that $NO_x$ and soot emissions from the engine can be reduced over the entire engine-operating load range from low to high load and that fuel consumption can be also reduced.

BRIEF DESCRIPTION OF THE DRAWINGS

FIG. 4 is a graphical representation showing an example of a map for excess air ratio to be inputted to the electronic control unit shown in FIG. 1;

FIG. 5 is a graphical representation showing an example of a map for EGR ratio to be inputted to the electronic control unit shown in FIG. 1;

DETAILED DESCRIPTION OF THE PREFERRED EMBODIMENT

A preferred embodiment of the invention will be described in conjunction with the attached drawings.

Figure 1:
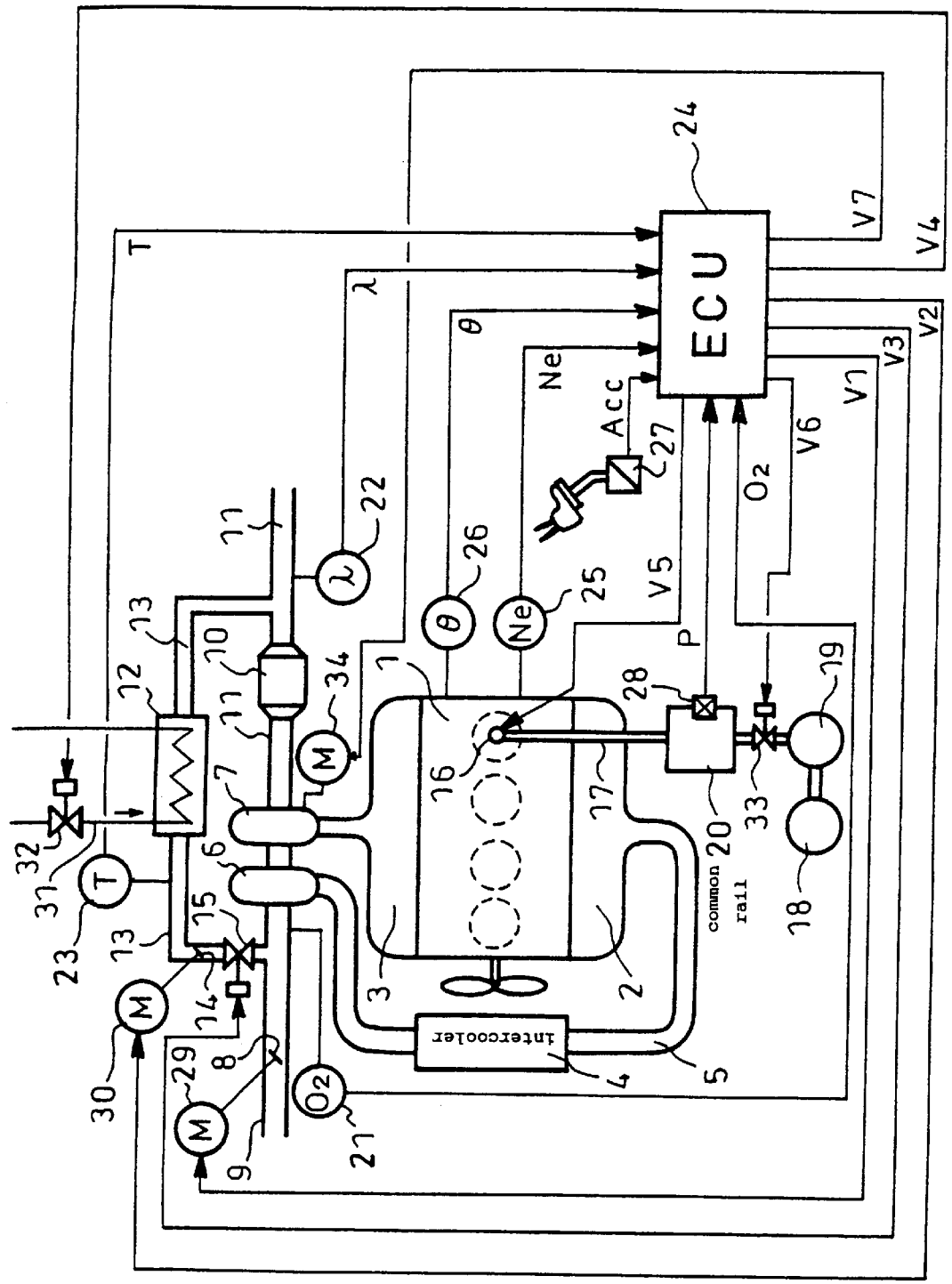
FIG. 1 is a block diagram of a control system showing an embodiment of an internal combustion engine according to the invention.

As shown in FIG. 1, an engine body 1 has one side to which is connected an intake manifold 2 for supplying suction air to each cylinder. The body 1 has the other side to which is connected an exhaust manifold 3 for taking up exhaust gas from each of the cylinders.

To the intake manifold 2, an intake conduit 5 is connected at its one end. The intake conduit 5 has an intercooler 4 at its intermediate portion and is connected at its other end to a compressor 6 of a turbocharger. The exhaust manifold 3 is connected at its downstream side in a direction of exhaust gas flow to a turbine 7 of the turbocharger.

The compressor 6 is connected at its entry side to an intake conduit 9 with a throttle valve 8 incorporated therein. The turbine 7 is connected at its discharge side to an exhaust conduit 11 having at its intermediate portion a particulate filtering unit 10 such as DPF or catalytic DPF.

The exhaust conduit 11 is connected at its portion downstream of the particulate filtering unit 10 in the direction of exhaust gas flow, via an EGR conduit 13 having an EGR cooler 12 at its intermediate portion, to a portion of the intake conduit 9 downstream of the valve 8 in the direction of intake flow. The EGR conduit 13 has, at its portion downstream of the EGR cooler 12 in the direction of exhaust gas flow (EGR), throttle and control valves 14 and 15 in the order named. The control valve 15 serves to completely shut off the EGR conduit 13 so that the EGR gas may not flow through the EGR conduit 13 when no EGR ratio is controlled.

Connection of the EGR conduit 13 to the exhaust and intake conduits 11 and 9 is to ensure that a large amount of EGR gas can be introduced into the EGR conduit 13 using an EGR system with a low pressure loop. More specifically, pressure (positive pressure) in the EGR conduit 13 at its side connected to the exhaust conduit 11 is higher than the pressure (negative pressure) in the EGR conduit 13 at its side connected to the intake conduit 9 so that the exhaust gas can easily flow through the EGR conduit 13.

In the case of an EGR system with a high pressure loop, the EGR conduit is connected to both the exhaust and intake manifolds 3 and 2 so that the exhaust gas can flow from the exhaust manifold 3 to the intake manifold 2. In this case, the pressure in the EGR conduit at its side connected to the exhaust manifold 3 is not necessarily higher than the pressure in the EGR conduit at its side connected to the intake manifold 2, which may lead to much difficulty in causing a large amount of exhaust gas to flow from the manifold 3 to the manifold 2. Thus, for example, a blower must be provided to cause the exhaust gas to flow from low to high pressure side.

Provision of the particulate filtering unit 10 on the exhaust conduit 11 upstream of its connection to the EGR conduit 13 is to prevent the compressor 6 and intercooler 4 from being fouled with particulate matter (soot).

An injection nozzle 16 of each cylinder, which serves for injecting fuel to combustion chamber, is connected to one end of a fuel feed conduit 17 which in turn is connected at its other end to a common rail 20 for pressure accumulation of the fuel supplied from a feed pump 18 via a pressure pump 19. The pumps 18 and 19 are driven by a part of engine output.

The intake conduit 9 has an oxygen concentration sensor 21 connected to the conduit 9 downstream of its connection with the EGR conduit 13 in the direction of intake flow. The exhaust conduit 11 has an excess air ratio sensor 22 connected to the exhaust conduit 11 downstream of its connection with the EGR conduit 13 in the direction of exhaust gas flow. The EGR conduit 13 has an EGR gas temperature sensor 23 connected to the conduit 13 downstream of its connection with the EGR cooler 12 in the direction of EGR gas flow. Thus, inputted as electric signals to an electronic control unit 24 are oxygen concentration $O_2$ of the intake in the conduit 9 detected by the sensor 21, excess air ratio $\lambda$ of the exhaust gas in the exhaust conduit 11 detected by the sensor 22 and temperature. T of the EGR gas in the conduit 13 detected by the sensor 23.

The engine body 1 is provided with an engine speed sensor 25 and a crankshaft angle sensor 26. Engine speed (number of revolutions of engine) Ne detected by the sensor 25 and crankshaft angle $\theta$ detected by the sensor 26 are inputted as electric signals to the electronic control unit 24.

In order to detect the engine load, there is provided an accelerator stepped-on degree sensor 27. Accelerator stepped-on degree (accelerator-related valve opening degree) Acc detected by the sensor 27 is inputted as electric signal to the electronic control unit 24.

The common rail 20 is provided with a pressure sensor 28. Pressure P of fuel in the common rail 20 detected by the sensor 28 is inputted as electric signal to the electronic control unit 24.

In the unit 24, the respective input signals are processed to give throttle angle commands V1 and V2 to drives 29 and 30 for the throttle valves 8 and 14, respectively. Valve opening degree commands V3 and V4 are respectively given to the control valve 15 and a control valve 32 on a cooling water line 31 for supply of cooling water to the EGR cooler 12.

From the unit 24, an ON command V5 may be given to a solenoid coil for selective opening and closing of the valve of the injection nozzle 16; a valve opening degree command V6, to a solenoid coil of a pressure control valve 33 for the pressure pump 19; and a vane opening degree command V7, to a drive 34 which may selectively open and close vanes of the turbine 7 of the turbocharger.

Inputted in advance on the electronic control unit 24 are various types of maps for controlling each device and unit based on the detected engine speed Ne and accelerator stepped-on degree Acc. Examples of these maps are shown in FIGS. 2–7.

Figure 2:
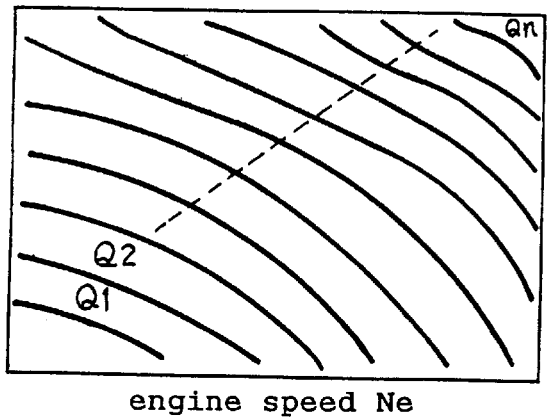
FIG. 2 is a graphical representation showing an example of a map for injection amount of an injection nozzle to be inputted to an electronic control unit shown in FIG. 1.

FIG. 2 shows a map for determining amount of fuel to be injected from the injection nozzle 16. Each of curves $Q_1$, $Q_2$, ... and $Q_n$ represents a diagram where amount of fuel injected is the same while the accelerator stepped-on degree Acc and the engine speed Ne are different or varied. Amount of fuel to be injected is increased in the order from $Q_1$, $Q_2$, ... to $Q_n$.

Figure 3:
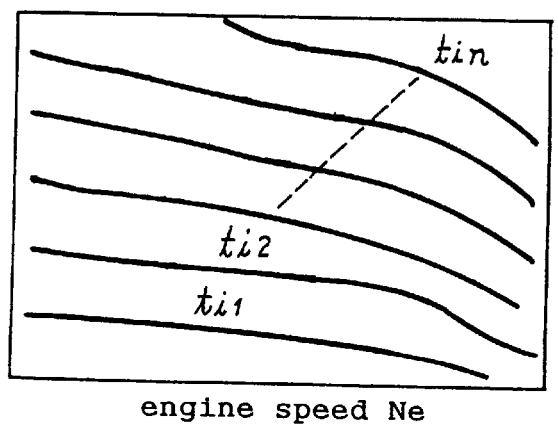
FIG. 3 is a graphical representation showing an example of a map for injection timing of the injection nozzle to be inputted to the electronic control unit shown in FIG. 1.

FIG. 3 represents a map for determining the timing to inject the fuel from the injection nozzle 16. Each of curves $t_{i1}$, $t_{i2}$, ... and $t_{in}$ represents a diagram where injection timing is the same while accelerator stepped-on degree Acc and engine speed Ne are different or varied. The injection timing is earlier in the order from $t_{i1}$, $t_{i2}$, ... to $t_{in}$.

FIG. 4 is a map for determining the opening degree of the throttle valve 8. Each of curves $\lambda_1$, $\lambda_2$, ... and $\lambda_n$ represents a diagram where excess air ratio is the same while the accelerator stepped-on degree Acc and the engine speed Ne are different or varied. Excess air ratio $\lambda$ and the opening degree of the throttle valve 8 are decreased in the order from $\lambda_1$, $\lambda_2$, ... to $\lambda_n$.

FIG. 5 is a map for determining the opening degree of the throttle valve 14. Each of curves $EGR_1$, $EGR_2$, ... and $EGR_n$ represents a diagram where the EGR ratio is the same while the accelerator stepped-on degree Acc and the engine speed Ne are different or varied. The EGR ratio and the opening degree of the throttle valve 14 are decreased in the order from $EGR_1$, $EGR_2$, ... to $EGR_n$.

Figure 6:
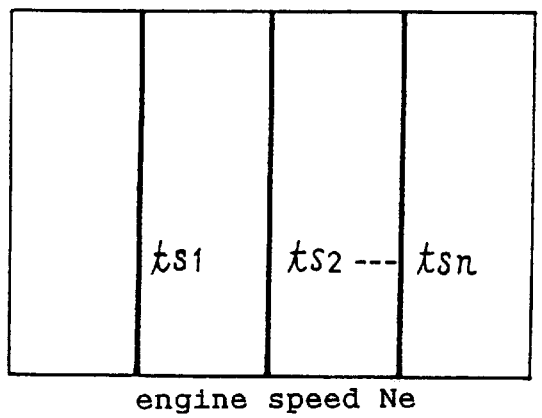
FIG. 6 is a graphical representation showing an example of a map for intake valve opening timing to be inputted to the electronic control unit shown in FIG. 1.

FIG. 6 is a map for determining the timing to open the intake valve for intake to each cylinder of the engine. Each of curves $t_{s1}$, $t_{s2}$, ... and $t_{sn}$ represents a diagram where the timing to open the intake valve is the same while the accelerator stepped-on degree Acc and the engine speed Ne are different or varied. The time to open the intake valve is earlier in the order from $t_{s1}$, $t_{s2}$, ... to $t_{sn}$.

Figure 7:
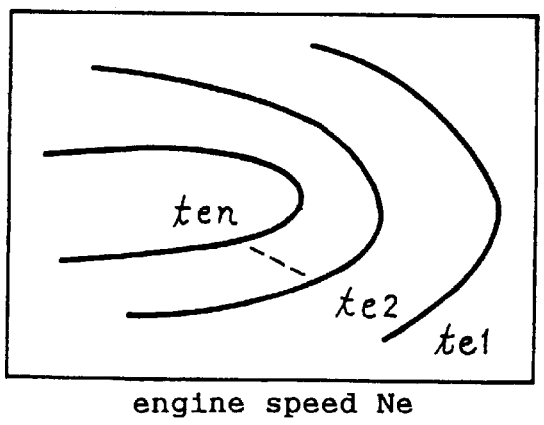
FIG. 7 is a graphical representation showing an example of a map for intake valve closing timing to be inputted to the electronic control unit shown in FIG. 1.

FIG. 7 is a map for determining the timing to close the intake valve. Each of curves $t_{e1}$, $t_{e2}$, ... and $t_{en}$ represents a diagram where the timing to close the intake valve is the same while the accelerator stepped-on degree Acc and the engine speed Ne are different or varied. The timing to close the intake valve is earlier in the order from $t_{e1}$, $t_{e2}$, ... to $t_{en}$.

In addition to the above, as maps to be provided on the electronic control unit 24 to control each device and unit, there may be various other maps such as a map for vane opening degree (VGT opening degree) of the turbine 7 of the turbocharger, a map for pressure in the common rail 20, etc.

Mode of operation of the embodiment illustrated will be described.

In the engine as described above, fresh air sucked into the intake conduit 9 is mixed with the EGR gas from the EGR conduit 13 and sent to the compressor 6 of the turbocharger where it is compressed and is sent to the intake conduit 5. After being cooled by the intercooler 4, it is introduced to each cylinder of the engine body 1 through the intake manifold 2.

The fuel from the common rail 20 is injected to combustion chamber of each cylinder via the injection nozzle 16. It is mixed with the intake gas and is rapidly burned. By a force generated by the combustion, the engine is driven.

The exhaust gas discharged from each cylinder is introduced to the turbine 7 of the turbocharger through the exhaust manifold 3. It drives the compressor 6 via the turbine 7 and is supplied to the particulate filtering unit 10 from the turbine 7 via the exhaust gas conduit 11.

Thus, the particulate matter in the exhaust gas supplied to the particulate filtering unit 10 is removed by the unit 10. The exhaust gas thus free from the particulate matter is sent to a subsequent process through the exhaust conduit 11. In this case, a part of the exhaust gas is sent to the EGR conduit 13 and is cooled down by the EGR cooler 12 to be turned into the EGR gas with a predetermined temperature and is then sent from the EGR conduit 13 to the intake conduit 9, whereby exhaust gas recirculation (EGR control) is performed.

By the operation as described above, the amount of $NO_x$ and soot emissions can be reduced.

Figure 8:
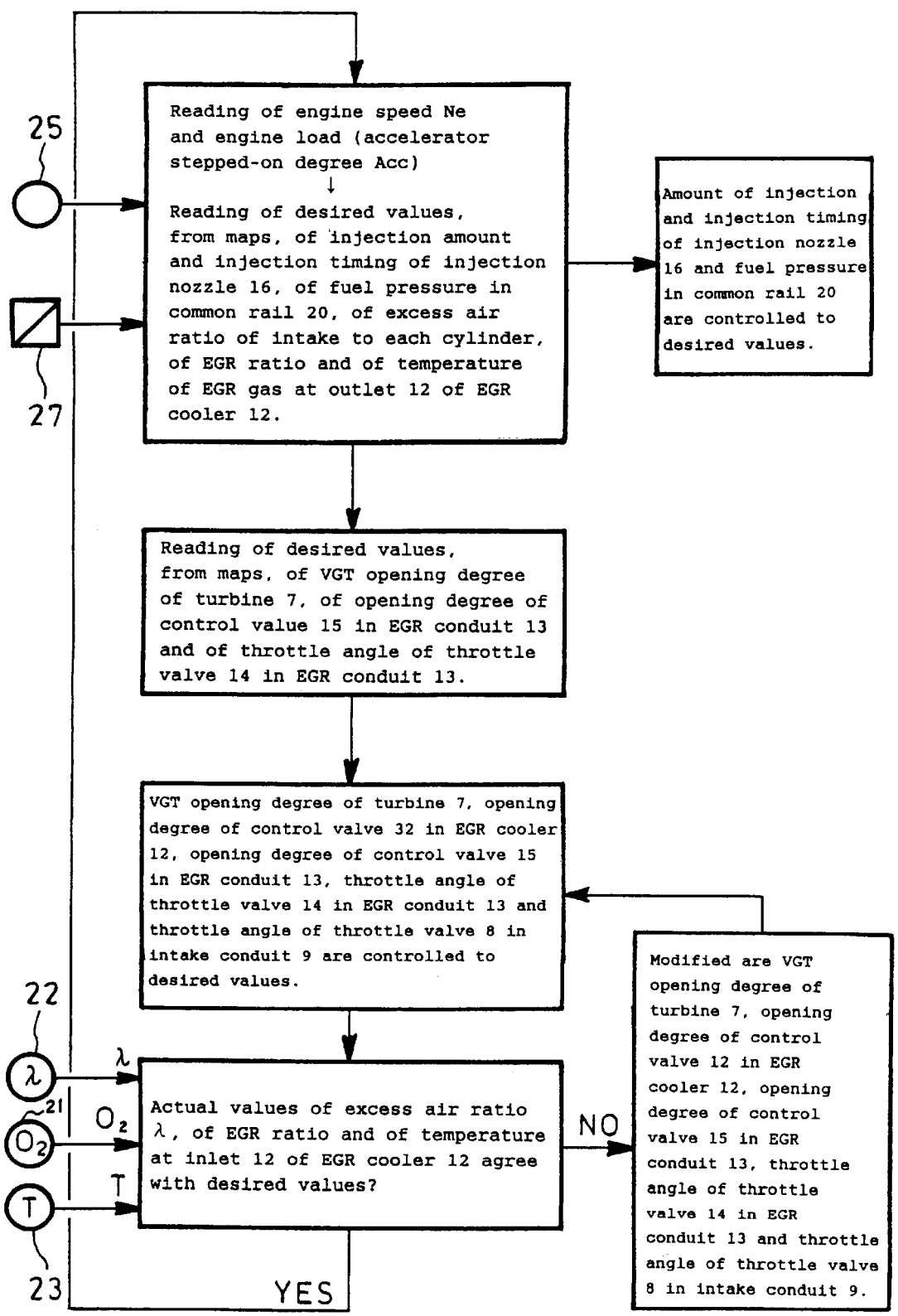
FIG. 8 is a flow chart showing control of various devices and units according to the block diagram of the control system shown in FIG. 1.

Next, general outline of engine operation in a case where the EGR control is performed will be described in conjunction also with FIG. 8.

When the engine is operated, inputted as electric signals to the electronic control unit 24 are the data such as the accelerator stepped-on degree Acc detected by the sensor 27, the engine speed Ne detected by the sensor 25, the crankshaft angle $\theta$ detected by the sensor 26, the oxygen concentration $O_2$ detected by the sensor 21, the excess air ratio $\lambda$ detected by the sensor 22, the temperature T of the EGR gas detected by the sensor 23, etc. In the unit 24, the data are processed according to each of the maps inputted in advance and each of the commands V1–V7 is outputted.

More specifically, in the unit 24, desired values of the amount of injection and injection timing of the injection nozzle 16, of the fuel pressure in the common rail 20, of the excess air ratio of intake air to be introduced into each cylinder and of temperature of the EGR gas at the outlet of the EGR cooler 12 are read from the corresponding maps incorporated in advance in the unit 24 on the basis of the inputted engine speed Ne and the inputted accelerator stepped-on degree Acc. Based on these desired values, the ON command V5 is given to the solenoid coil for selectively opening and closing the valve of the injection nozzle 16 so as to control the amount of injection and injection timing of the injection nozzle 16 to the desired values. The valve opening degree command V6 is given to the pressure control valve 33 of the pressure pump 19 so as to control the fuel pressure accumulated in the common rail 20 to the desired value.

Further, in the unit 24, the desired values of VGT opening degree of the turbine 7 of the turbocharger, of the opening degree of the control valve 32 in the EGR cooler 12, of the opening degree (totally opened or totally closed) of the control valve 15 in the EGR conduit 13, of the throttle angle of the throttle valve 14 in the EGR conduit 13, of the throttle angle of the throttle valve 8 in the intake conduit 9, etc. are read from the corresponding maps. Based on these desired values, the vane opening degree command V7 is given to the drive 34 so as to control the VGT opening degree of the turbine 7 to the desired value. The valve opening degree command V4 is given to the control valve 32 of the EGR cooler 12 so as to control the opening degree of the control valve 32 to the desired value. The valve opening degree command V3 is given to the control valve 15 so as to control the opening degree (totally opened or totally closed) of the control valve 15 to the desired value. The throttle angle command V2 is given to the drive 30 to control the throttle angle of the throttle valve 14 to the desired value. The throttle angle command V1 is given to the drive 29 so as to control the throttle angle of the throttle valve 8 to the desired value.

Then, judged are whether actual value of the excess air ratio $\lambda$ detected by the sensor 22 agrees with the desired value or not, whether the actual value of the EGR ratio determined from the excess air ratio $\lambda$ and oxygen concentration $O_2$ respectively detected by the sensors 22 and 21 agrees with the desired value or not and whether the actual temperature T of the EGR gas detected by the sensor 23 agrees with the desired value or not. In a case where these actual values agree with the desired values, the procedure is returned to the reading of the respective maps based on the engine speed Ne and the accelerator stepped-on degree Acc.

However, if the actual values do not agree with the desired values, modified are the desired values of the VGT opening degree of the turbine 7, of the opening degree of the control valve 32 in the EGR cooler 12, of the opening degree of the control valve 15 in the EGR conduit 13, of the throttle angle of the throttle valve 14 in the EGR conduit 13 and of the throttle angle of the throttle valve 8 in the intake conduit 9. Then, the VGT opening degree, the opening degree of the control valve 32, the opening degree of the control valve 15 and the throttle angles of the throttle valves 14 and 8 are controlled to the modified, desired values.

Next, referring to FIGS. 9–22, detailed description will be given on control procedure when the amounts of $NO_x$ and soot emissions in the exhaust gas from diesel engine are reduced and fuel consumption is also decreased in the entire engine-operating load range from low to high engine load.

I) In a Case of Low to Medium Load

Figure 9:
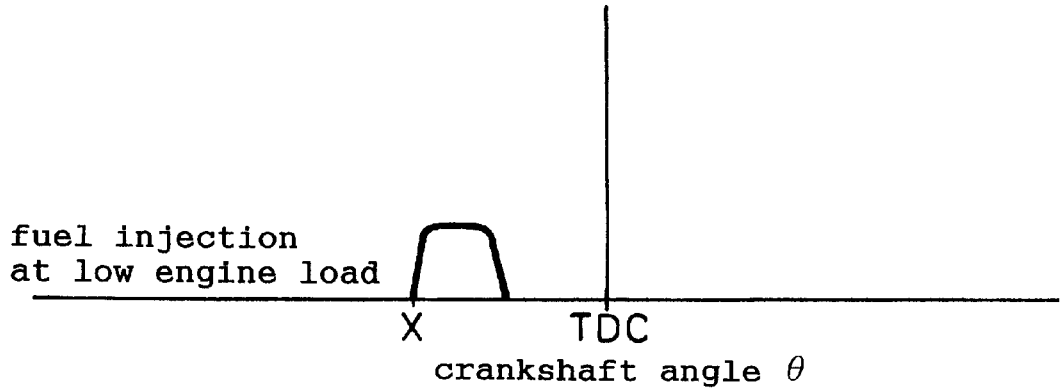
FIG. 9 is a graphical representation showing fuel injection timing at low engine load.
Figure 10:
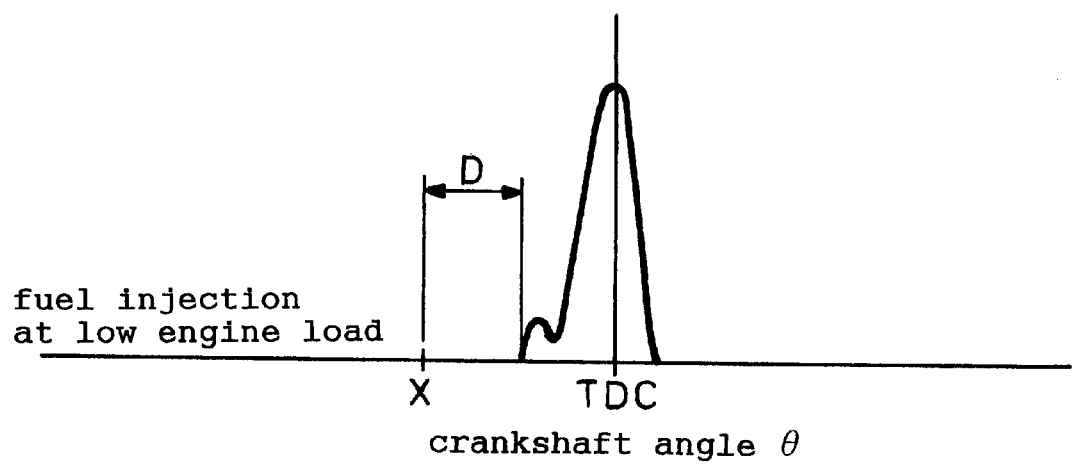
FIG. 10 is a graphical representation showing heat generation ratio at low engine load.
Figure 11:
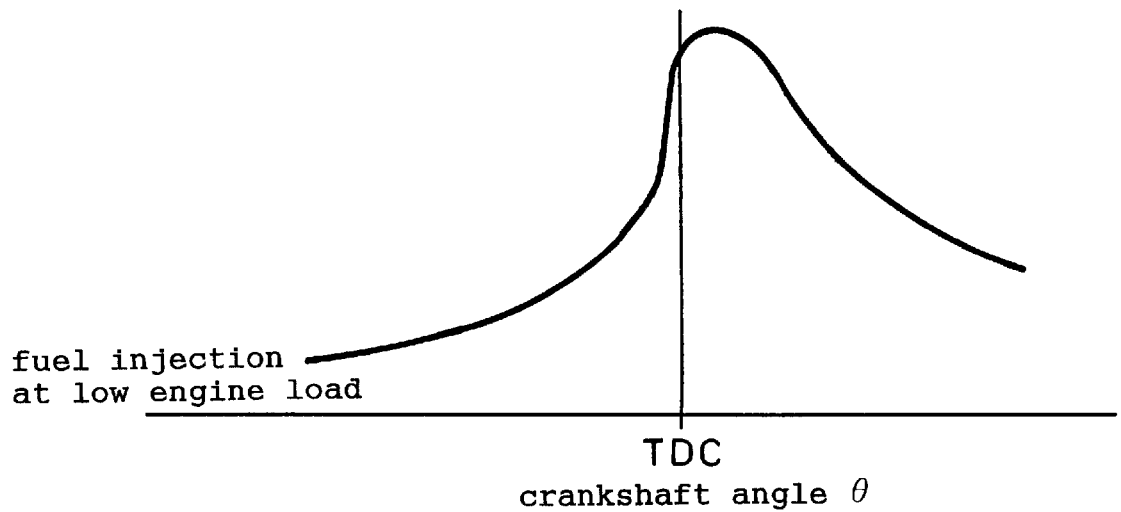
FIG. 11 is a graphical representation showing intra-cylinder pressure at low engine load.

In this case, the timing to start the injection of fuel from the injection nozzle 16 is set to 10–30 BTDC (Before Top Dead Center) shown as position X in FIG. 9. Excess air ratio $\lambda$ is controlled to as high as 1.2–2 and the EGR ratio, to as low as 40–60%. As a result, ignition delay D is increased as shown in FIG. 10 and fuel injection is completed during the ignition delay D. In so doing, the fuel is turned to lean mixture gas after the completion of injection and it is burned at low temperature (lean premixed compression ignition). As a result, no $NO_x$ and soot are discharged. Intra-cylinder pressure is as shown in FIG. 11.

II) In a Case of Medium to High Load

Figure 12:
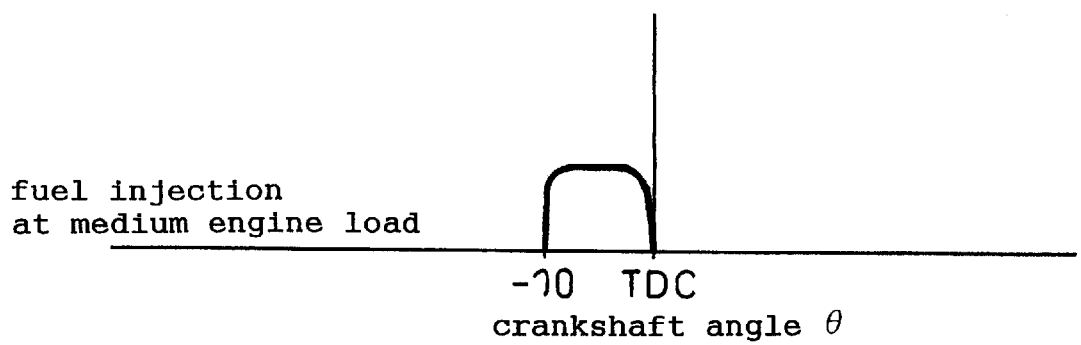
FIG. 12 is a graphical representation showing fuel injection timing at medium engine load.
Figure 13:
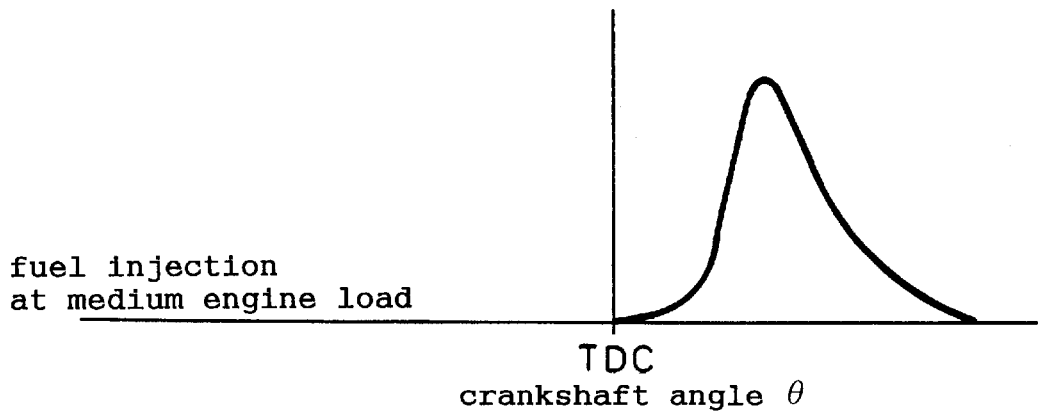
FIG. 13 is a graphical representation showing heat generation ratio at medium engine load.
Figure 14:
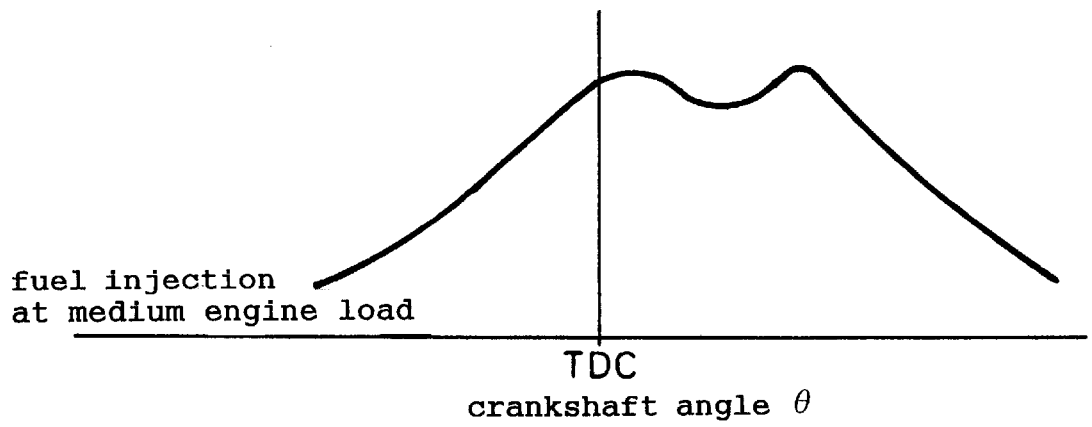
FIG. 14 is a graphical representation showing intra-cylinder pressure at medium engine load.

In this case, the timing to start the injection of fuel from the injection nozzle 16 is set to 0–10 BTDC as shown in FIG. 12. Excess air ratio $\lambda$ is controlled to as low as 1.0–1.2 and the EGR ratio, as high as 50–70%. As a result, combustion is performed at low temperature in expansion process as shown in FIG. 13 and no $NO_x$ and soot are discharged. Intra-cylinder pressure is as shown in FIG. 14.

Figure 18:
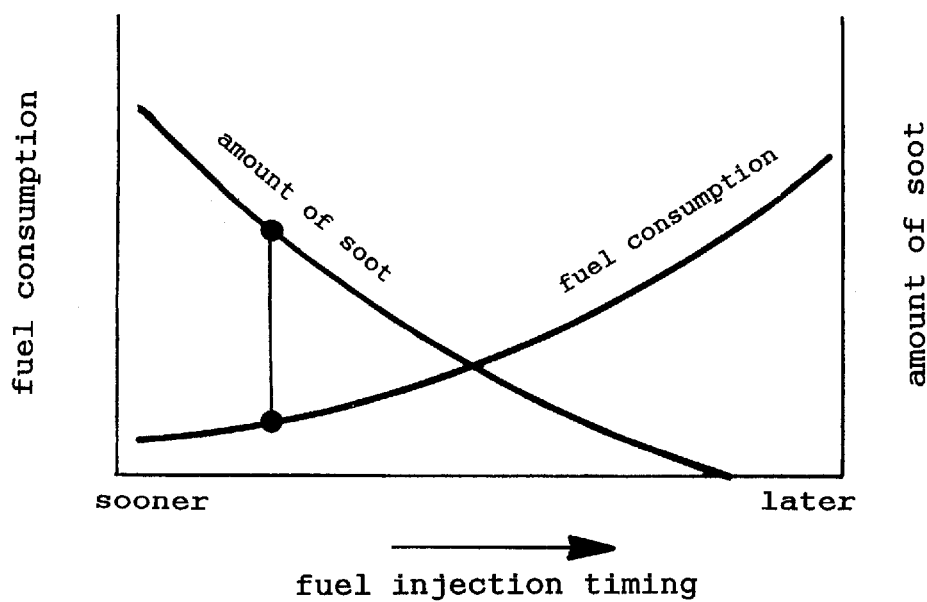
FIG. 18 is a graphical representation showing relationship between fuel injection timing on the one hand and fuel consumption and amount of soot on the other hand.

FIG. 18 shows a graphical representation showing relationship between fuel injection timing on the one hand and fuel consumption and amount of soot generated on the other hand. It is evident from this graph, if fuel injection timing is selected to decrease fuel consumption, particulate matter is generated. However, the particulate matter is caught by the particulate filtering unit 10 and is not discharged to the atmospheric air.

III) In a Case of High Load

Figure 15:
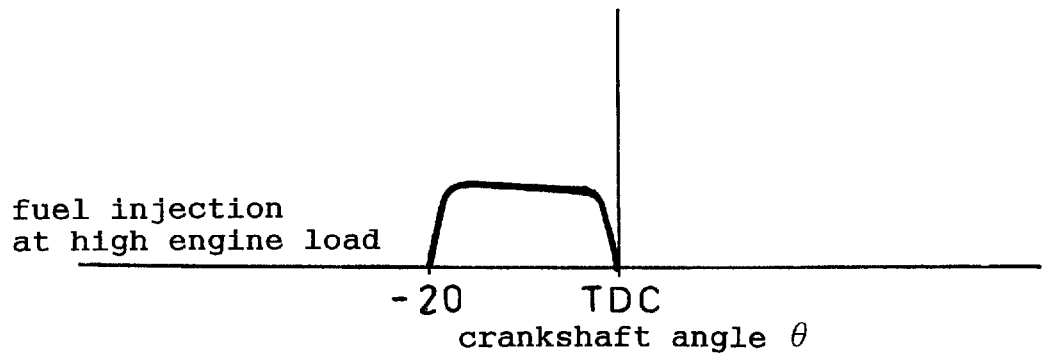
FIG. 15 is a graphical representation showing fuel injection timing at high engine load.
Figure 16:
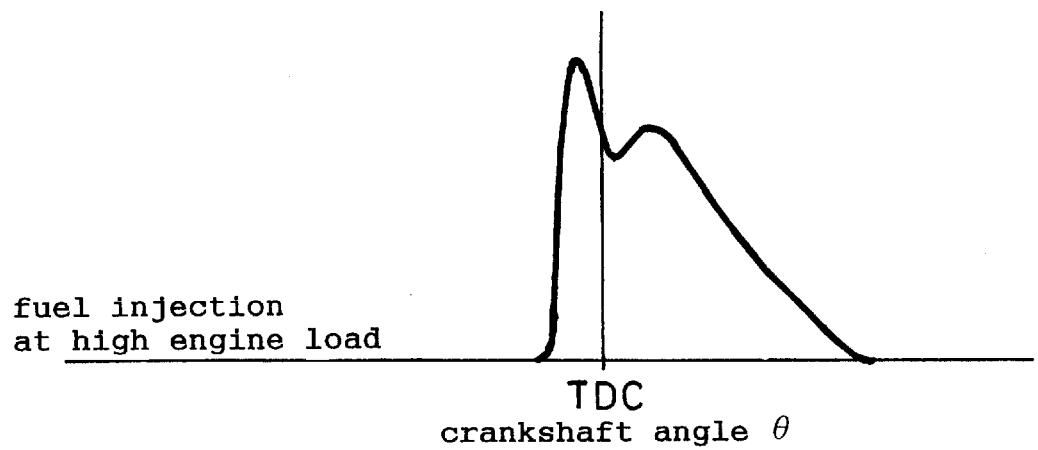
FIG. 16 is a graphical representation showing heat generation ratio at high engine load.
Figure 17:
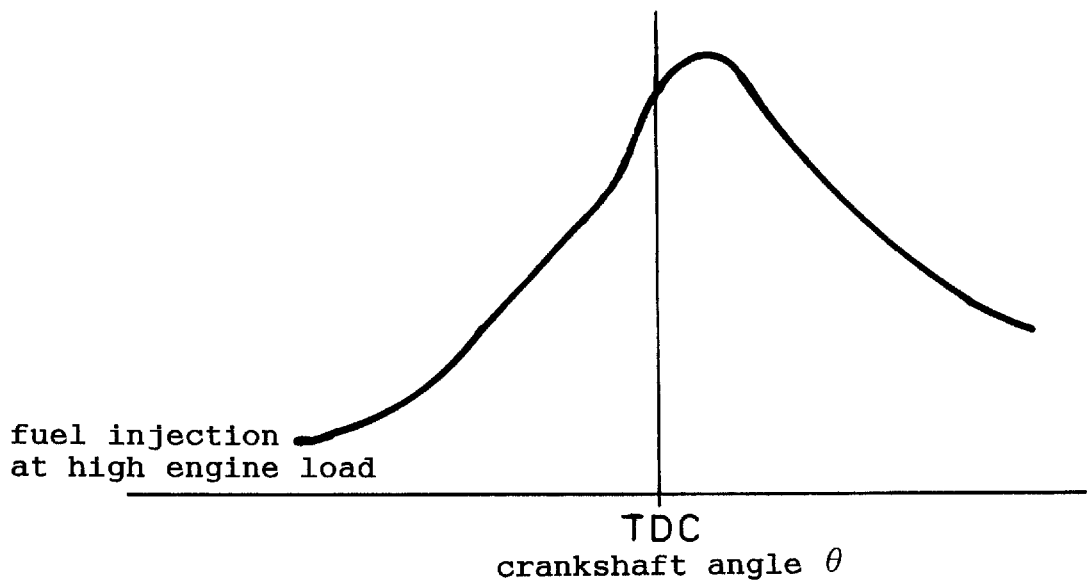
FIG. 17 is a graphical representation showing intra-cylinder pressure at high engine load.

In this case, the timing to start the injection of fuel from the injection nozzle 16 is set to 0–20 BTDC as shown in FIG. 15. Control is performed to carry out normal diesel combustion such that excess air ratio $\lambda$ is as high as 1.5–2 and the EGR ratio is as low as 0–50%. Combustion condition in this case is as shown in FIG. 16 and intra-cylinder pressure is as shown in FIG. 17. Under this condition, the amounts of $NO_x$ and soot emissions cannot be turned to zero, but the particulate is caught by the particulate filtering unit 10.

Figure 19:
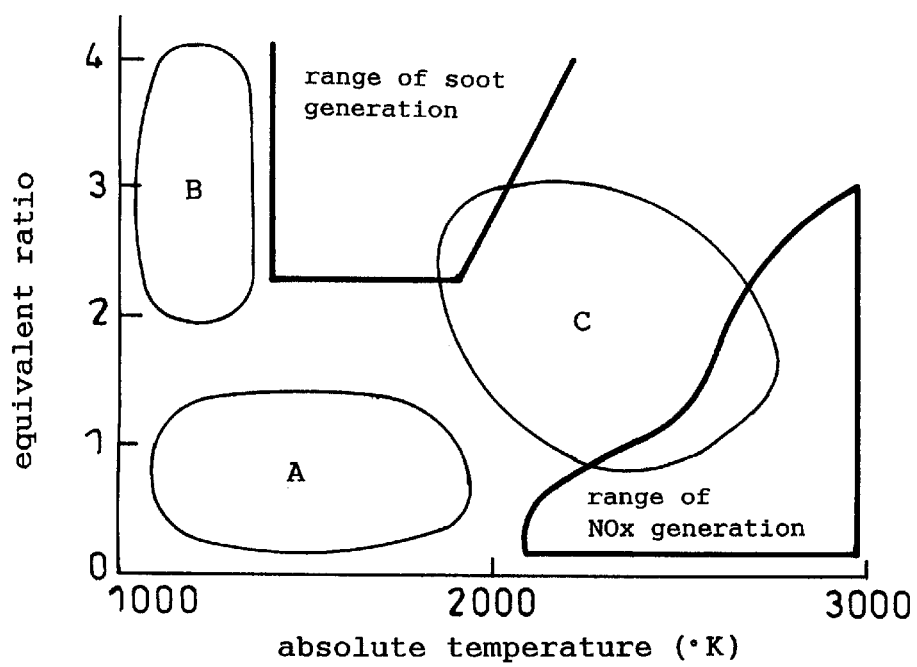
FIG. 19 is a graphical representation showing relationship between absolute temperature and equivalent ratio of intake gas in a combustion chamber in a case where combustion is controlled in the internal combustion engine according to the invention.
Figure 20:
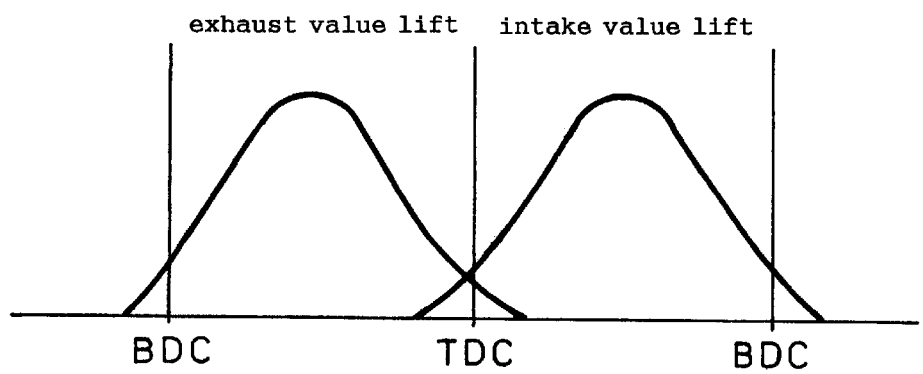
FIG. 20 is a graphical representation showing opening and closing of exhaust and intake valves at low engine speed and at low engine load.
Figure 21:
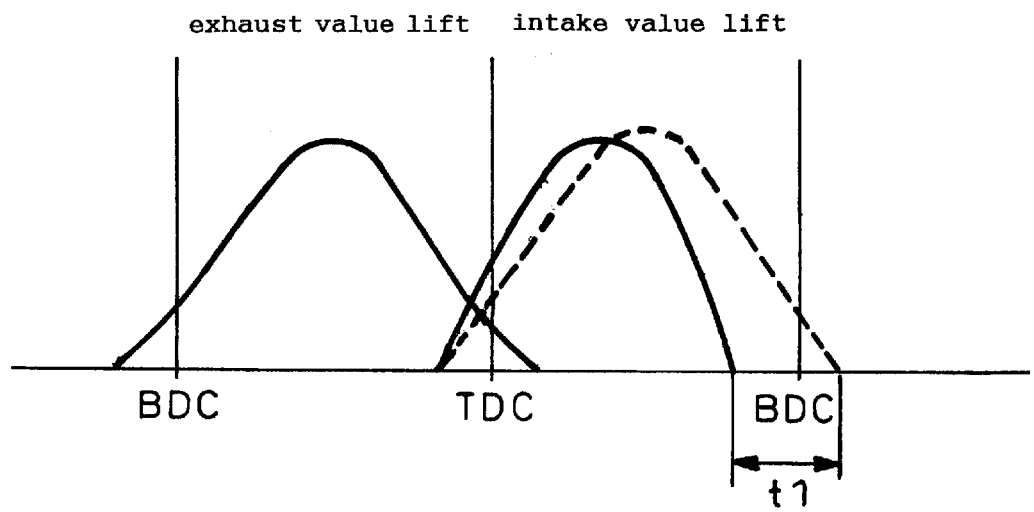
FIG. 21 is a graphical representation showing opening and closing of the exhaust and intake valves at low engine speed and at high engine load.
Figure 22:
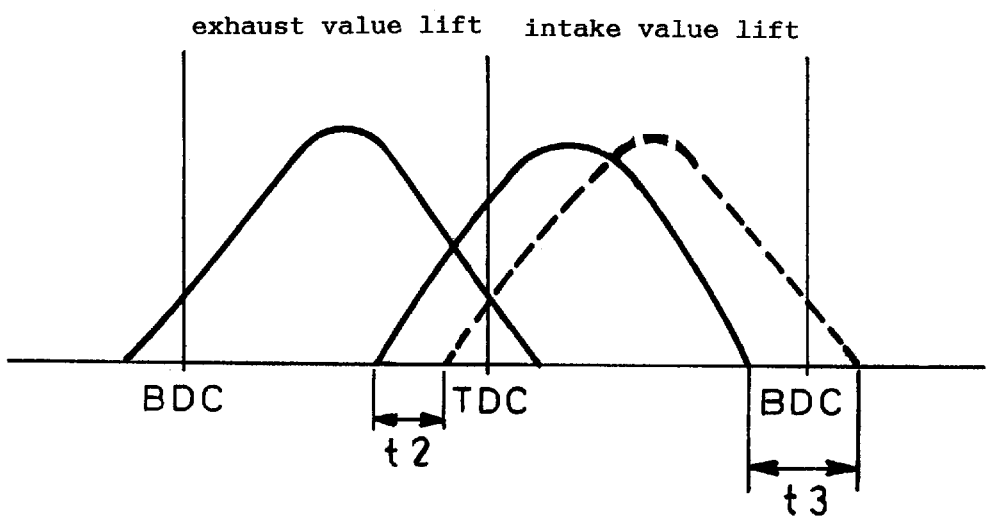
FIG. 22 is a graphical representation showing opening and closing of the exhaust and intake valves at high engine speed and at high engine load.

FIG. 19 is a graphical representation showing relationship of equivalent ratio (inverse number of excess air ratio $\lambda$) and absolute temperature at each of the engine loads when combustion is controlled as in I), II) and III) above. Symbol A shows the range of combustion from low to medium load; B, the range of combustion from medium to high load; and C, the range of combustion of high load. It is evident from the graph of FIG. 19 that generation of $NO_x$ and soot can be turned to nearly zero in the cases of low and medium loads, while, in the case of high load, some amounts of $NO_x$ and soot emissions may be generated depending on the conditions. In FIGS. 20–22, solid lines represent the conditions in the case where exhaust and intake valve lifts in each cylinder are controlled under the combustion control as described above. FIG. 20 shows the conditions of the exhaust and intake valve lifts at low speed and low load. FIG. 21 shows the conditions of the exhaust and intake valve lifts at low speed and medium to high load. FIG. 22 shows the conditions of the exhaust and intake valve lifts at high speed and high load.

In the case of low speed and high load as shown in FIG. 21, the timing to close the intake valve is set earlier by $t_1$ second compared with the case of low speed and low load. In the case of high speed and high load as shown in FIG. 22, the timing to open the intake valve is set earlier by $t_2$ second, and the timing to close is set earlier by $t_3$ second. These timings are set by the commands from the electronic control unit 24 as shown in FIG. 1.

It is to be understood that the internal combustion engine according to the invention is not limited to the embodiment shown in the drawings and that various changes and modifications may be made without departing from the spirit and the scope of the invention. For example, as the means to increase ignition delay, compression ratio of piston may be changed, or shape and structure of combustion chamber or injection nozzle may be changed. As the means to recirculate a large quantity of EGR gas, EGR pump may be used. Further, in order that control may be effected to generate heat at or near TDC, the injection nozzle may be designed in multiple stages or timing of injection may be controlled, or EGR ratio may be controlled.

As described above, in the internal combustion engine according to the invention, it is ensured in the entire engine-operating load range from low to high load that amounts of $NO_x$ and soot emissions from the engine can be decreased and that fuel consumption can be reduced.

What is claimed is:

1. An internal combustion engine comprising means for decreasing combustion temperature and means for increasing ignition delay, both of said means being used at low to medium engine load such that combustion of fuel in the engine is at a temperature lower than that at which $NO_x$ is produced and at an equivalent ratio lower than that at which soot is produced, said means for decreasing combustion temperature being used at medium to high engine load such that combustion of the fuel in the engine is at a temperature lower than that at which $NO_x$ or soot is produced.

2. An internal combustion engine as set forth in claim 1 further comprising an exhaust gas recirculation passage for communication of an exhaust conduit downstream of a turbine of a turbocharger with an intake conduit upstream of a compressor of the turbocharger and means for removing particulate matter provided on a portion of the exhaust conduit upstream of a connection of said exhaust conduit with the exhaust gas recirculation passage.

3. An internal combustion engine as set forth in claim 1 wherein the means for increasing ignition delay comprises means for controlling timing of fuel injection to set earlier timing for fuel injection.

4. An internal combustion engine as set forth in claim 2 wherein the means for decreasing combustion temperature comprises means for recirculating exhaust gas to the engine via the exhaust gas recirculation passage.

5. An internal combustion engine as set forth in claim 2 wherein circulation ratio of the exhaust gas to be circulated to the engine via the exhaust gas recirculation passage is set to more than about 40% at low to medium engine load, to more than about 50% at medium to high engine load and to less than about 50% at high engine load.

6. An internal combustion engine as set forth in claim 2 further comprising means for cooling the exhaust gas in the exhaust gas recirculation passage.

7. An internal combustion engine as set forth in claim 1 further comprising control means for adjusting timing for closing an intake valve for intake to the engine, said timing for closing the intake valve being retarded by said control means as the engine load is increased.

\* \* \* \* \*